Nov. 27, 1945. A. A. STUART, JR Re. 22,699
MAGNETIC COMPASS
Original Filed May 21, 1940 3 Sheets-Sheet 1
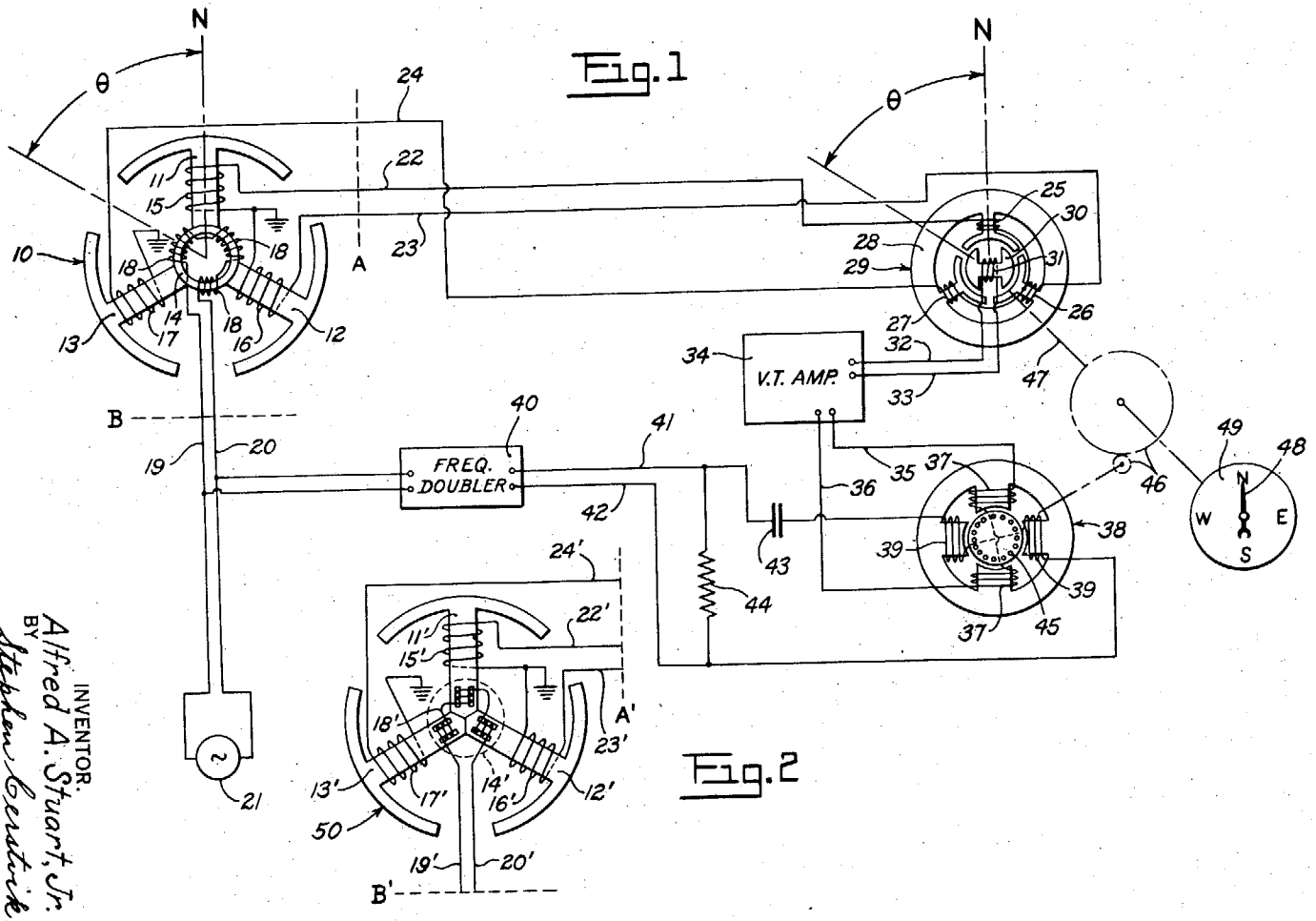
INVENTOR.
Alfred A. Stuart, Jr.
BY
Stephen Gerstvik.
ATTORNEY.

Nov. 27, 1945. A. A. STUART, JR Re. 22,699

MAGNETIC COMPASS

Original Filed May 21, 1940 3 Sheets-Sheet 2

INVENTOR.
Alfred A. Stuart, Jr.
BY Stephen Berstrik,
ATTORNEY.

Nov. 27, 1945. A. A. STUART, JR Re. 22,699

MAGNETIC COMPASS

Original Filed May 21, 1940 3 Sheets-Sheet 3

INVENTOR.
Alfred A. Stuart, Jr.
BY
Stephen Berstrik.
ATTORNEY.

Reissued Nov. 27, 1945 Re. 22,699

UNITED STATES PATENT OFFICE 22,699

MAGNETIC COMPASS

Alfred A. Stuart, Jr., Hasbrouck Heights, N. J., assignor to Bendix Aviation Corporation, Teterboro, N. J., a corporation of Delaware Original No. 2,361,433, dated October 31, 1944, Serial No. 464,095, October 31, 1942, which is a substitute for abandoned application Serial No. 336,444, May 21, 1940. Application for reissue October 31, 1944, Serial No. 561,252

19 Claims. (Cl. 33—204)

The present invention relates to magnetic compasses, and more particularly to the so-called earth inductor type of compass, and is a continuation of application Serial No. 336,444, filed May 21, 1940, entitled "Magnetic compass," which is, in turn, a continuation in part of application Serial No. 248,344, filed December 29, 1938, now Patent No. 2,240,680, dated May 6, 1941, entitled "Earth inductor compass."

Compasses used in navigation, and particularly in navigation of aircraft, have several disadvantages, chief among which are their insensitivity and their undependability during pitch and roll and under the effects of accelerations usually encountered on shipboard and in aircraft, and the fact that most earth inductor compasses of the prior art type required the rotation of the earth inductor element for generating the required voltage or for follow-up purposes.

The present invention has for one of its objects the provision of a novel structure for overcoming the foregoing and other deficiencies in magnetic compasses of the prior art, especially in prior earth inductor compasses, as will appear more fully hereinafter.

Another object of the present invention is the provision of an improved magnetic compass of the earth inductor type in which the earth inductor element is relatively stationary and has no rotatable or moving parts and is supported on the ship or aircraft in a fixed reference plane by a stabilizing gyroscope, as distinguished from the earth inductor compass disclosed in the aforesaid Patent No. 2,240,680 in which the earth inductor includes a rotatable element requiring an electric motor to rotate it in order to generate the required electromotive force from the earth's magnetic field, thereby making it difficult to employ a stabilizing gyroscope to maintain the inductor in a fixed reference plane.

A further object is to provide an improved magnetic compass of the earth inductor type disclosed in the aforesaid Patent No. 2,240,680, but in which the only rotating parts are in the remote indicator, thereby eliminating the necessity of using an electric motor or other prime mover to rotate the earth inductor or any part thereof, and making it possible to readily stabilize the inductor in a fixed reference plane by means of a stabilizing gyroscope of gyro-vertical.

Still another object is to provide a novel and improved magnetic compass, the indications of which may be amplified by a torque amplifier, and also to provide a magnetic repeating device which will repeat, with amplified torque, the movement of a magnetic needle or other magnetic element.

The foregoing and other objects and advantages of the invention will appear more fully hereinafter from a consideration of the detailed description which follows, taken together with the accompanying drawings wherein two embodiments of the invention are illustrated by way of example. It is to be expressly understood, however, that the drawings are for illustration purposes only, and are not to be construed as defining the limits of the invention, reference being had for this purpose to the appended claims.

In the drawings, wherein like reference numerals refer to like parts in the three embodiments:

Fig. 1 is a partly schematic representation of a magnetic compass of the present invention;

Fig. 2 is a showing of an essential part of the present invention which may be substituted in Fig. 1;

Figure 3:
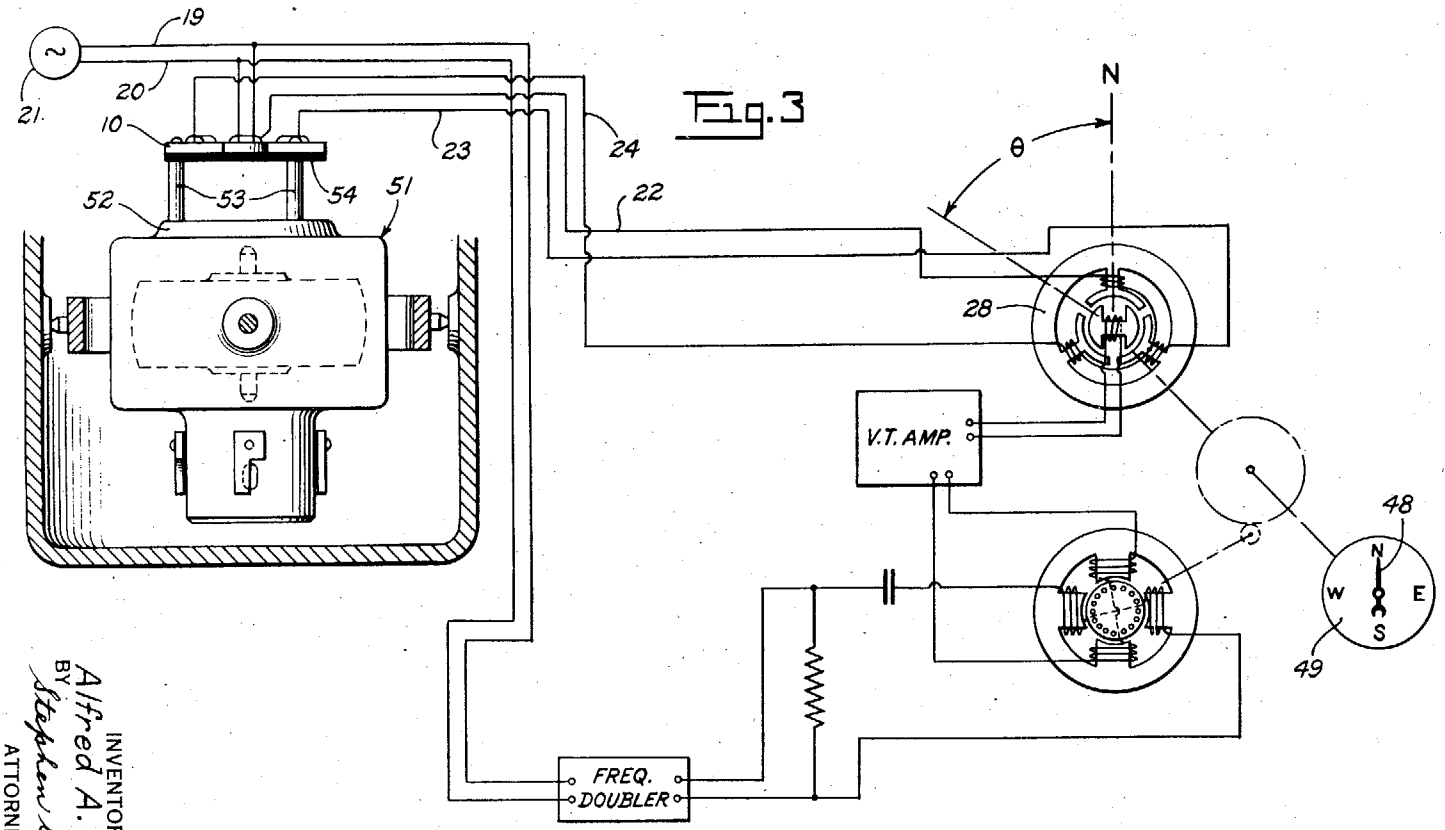
Fig. 3 is a showing, partly schematic, of the earth inductor compass stabilized in a horizontal plane by a gyroscope.

Briefly, the present invention, instead of having a rotatable earth inductor as in Patent No. 2,240,680, includes a novel pick-up device of material having high permeability and low retentivity, which is relatively stationary and which has a portion periodically magnetically saturated and unsaturated, and another portion having windings connected in multipolar relation, in which are induced voltages, the relative values of which are representative of the angular relation between a selected axis of symmetry of the pick-up device and the direction of the earth's magnetic field. These voltages are conducted to a remote receiving device which may be an "Autosyn," in the rotor of which are induced voltages similar to those induced in the windings of the relatively stationary pick-up device. An indicating pointer connected to the rotor will, therefore, indicate the direction of the earth's magnetic field, or the angular displacement of the pick-up device in the earth's magnetic field with the craft on which it is mounted. By means of an amplifier, the torque of the rotor may be increased to any desired value.

Having particular reference to Fig. 1, 10 designates a relatively stationary and non-rotatable magnetic pick-up device of highly permeable material, such as "Permalloy" or "Mumetal," having legs 11, 12 and 13, symmetrically disposed 120 degrees apart and converging upon the central ring portion, or stationary armature 14, of the same material. The legs 11, 12 and 13 have windings 15, 16 and 17, respectively, wound thereon, and central portion 14 has an exciting winding 18 which may be split up as shown, into three equal portions for the purposes of symmetry. Winding 18 is connected through leads 19 and 20 to a source of alternating current 21. Windings 15, 16 and 17 have their inner ends connected to ground, and their outer ends 22, 23 and 24, respectively, are connected to coils 25, 26 and 27, respectively, which are wound about the poles of the stator 28, of a conventional "Autosyn" motor 29. Rotor 30 of "Autosyn" 29 carries a coil 31, which is connected through leads 32 and 33 to the input of vacuum tube amplifier 34. The output of amplifier 34 is connected through leads 35 and 36 to one phase 37 of a two-phase induction motor 38. The other phase 39 is energized from source 21 through a frequency doubler 40 by way of conductors 41 and 42 of any conventional electrical coupling arrangement, such as condenser 43 and resistor 44. A suitable frequency doubler 40 may be of any conventional type; for example, it may be patterned after the frequency doubler shown and described on pages 706 and 707 of "Principles of Radio Communication" by Morecroft, 2nd edition Rotor 45 of motor 38 is geared to rotor 30 through any suitable train 46 connected to shaft 47, which has a pointer 48 rotatable therewith for indicating direction upon the compass card of azimuth scale 49. The circuit including amplifier 34, induction motor 38, gear train 46, etc., acts to amplify the torque available in rotor 30 and coil 31, and will be described later.

Assuming that the relatively stationary earth inductor 10 is disposed in the earth's magnetic field in a horizontal plane and leg 11 parallel with north and south, as shown in Fig. 1, with no exciting current in winding 18, the earth's field will thread through leg 11 and equally through legs 12 and 13, through armature 14. As long as the flux in legs 11, 12 and 13 is in a steady state, no voltage will be induced in windings 15, 16 and 17. However, if sufficient excitation current is supplied to winding 18 by source 21 to periodically saturate armature 14, then the earth's flux will decrease in legs 11, 12 and 13 at a rate depending upon the frequency of source 21, and a voltage will be induced in each of windings 15, 16 and 17, setting up therein, and in coils 25, 26 and 27, an alternating current. Windings 15, 16 and 17 are so situated on legs 11, 12 and 13, respectively, that no voltages are induced therein due to the saturation of armature 14. The magnetic field caused by saturation of armature 14 flows only through portion 14 and does not enter legs 11, 12 and 13. However, in saturating central armature portion 14, the reluctance of the path taken by the earth's field in legs 11, 12 and 13, prior to saturation, will become relatively high, forcing the earth's field to decrease in armature 14 and legs 11, 12 and 13, and to partially flow through a path of lower reluctance in the air.

Figure 4:
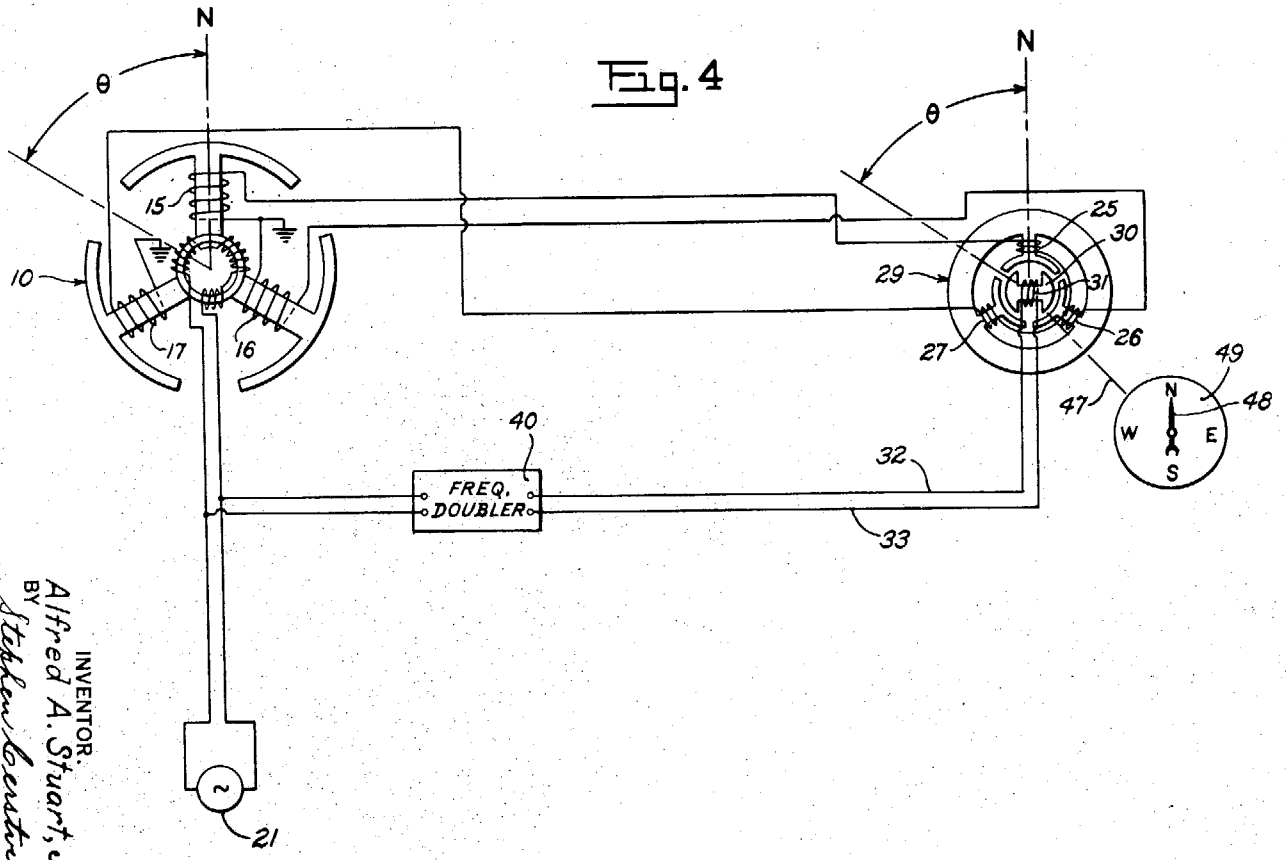
Fig. 4 is a schematic illustration of the compass shown in Fig. 1 with a slight change in the circuit thereof.

While the torque amplifier described above is of decided advantage for certain uses of the compass of the present invention, there is shown in Fig. 4 a circuit which does not employ a torque amplifier, but which is otherwise identical to the circuit shown in Fig. 1. The leads 32 and 33 of coil 31 are connected directly to the output of frequency doubler 40. The currents in coils 25, 26 and 27 will set up a resultant magnetic field in the rotor gap of "Autosyn" 29, and the current in coil 31 due to frequency doubler 40 will set up a field so that rotor 30 will be forced to rotate until the field of coil 31 is aligned with the resultant field of coils 25, 26 and 27. This position will be that at which the maximum number of lines of force are passing through coil 31. This condition is unique and will take place at only one position of the coil 31 for a given position of the magnetic pick-up device 10, due to the phase relation existing between the voltage of frequency doubler 40 and the voltage induced in windings 15, 16 and 17 by source 21. Thus, pointer 48 carried by rotor 30 on shaft 47 will indicate the true angular disposition of pick-up device 10 with respect to the earth's magnetic field.

When the compass of the present invention is used to indicate extremely weak fields, such as the earth's magnetic field, the use of the torque amplifier above described is desired, as extremely low torques resulting from current in coil 31, acting in conjunction with the magnetic field resulting from the flow of currents in coils 25, 26 and 27, may be insufficient to overcome the friction of the bearings and slip-rings attached to rotor 30. The current in coil 31 is amplified in the vacuum tube amplifier 34 and its output may be of any desired power rating without causing harmful reaction on coil 31. It is a well-known characteristic of vacuum tubes that the output has no substantial reactive effect upon the input. Therefore, unless coil 31 is in a null position, phase 37 will be energized, thereby causing rotor 45 to turn gear train 46, shaft 47, and along with the shaft, rotor member 30, until this latter member again reaches a null position, at which time phase 37 is de-energized and rotation of rotor 45 thereby stopped.

The winding 39 of one phase of rotor 38 is continuously energized from source 21 and through frequency doubler 40. No self-rotation of rotor 45 is possible while the winding of only one phase is energized, thus pointer 48 will not be rotated until there is current in coil 31 which is amplified in amplifier 34 for energizing phase 37, and this condition is fulfilled only when pick-up device 10 is being rotated in the earth's magnetic field. The current flowing in coil 31 and phase winding 37 will always be in the correct phase with respect to that in phase winding 39 to cause rotation in the correct direction. Thus, 180 degree ambiguity is eliminated. A torque amplifier, similar to that here disclosed, is disclosed in the aforesaid application Serial No. 248,344, filed December 29, 1938, now Patent No. 2,240,680, and assigned to the same assignee as the present invention.

Those versed in the art will readily comprehend that upon angular displacement of the pick-up device 10 clockwise with respect to the magnetic field by the angle $\theta$, the voltages induced in each of the legs 11, 12 and 13 will be changed to the value $N \cos \theta$, where N represents the value of voltage induced when the inductor or pick-up device 10 is disposed as shown in Fig. 1, and where $\theta$ is the angle through which device 10 is rotated to its new position; likewise, if device 10 is rotated clockwise through the angle $\theta$, rotor 30 is also rotated through the same angle $\theta$, and pointer 48 will indicate angle $\theta$. Thus, for each angle of displacement of pick-up device 10 in the earth's field, pointer 48 will move through the same angle of rotation. This relation holds true regardless of the angle or the direction of displacement of pick-up device 10.

A slightly different earth inductor or pick-up member 50, as shown in Fig. 2, may be substituted for the pick-up member 10 in Fig. 1, by merely superimposing Fig. 2 upon the circuit of Fig. 1, so that lines A' and B' coincide with lines A and B, respectively, of Fig. 1. Then the ends 22, 23 and 24 of windings 15, 16 and 17 will be replaced by ends 22', 23' and 24' of windings 15', 16' and 17', respectively, and leads 19' and 20' of exciting winding 18' will be substituted for the leads 19 and 20 of exciting winding 18.

With Fig. 1 modified in this respect, the operation of the complete circuit is identical to the operation of the circuit above described with respect to Fig. 1. However, leg members 11', 12' and 13' are connected directly together without the use of a ring, such as 14 in Fig. 1. When current from source 21 flows through winding 18', it will saturate each of the legs 11', 12' and 13' in the central armature area within the circle designated 14' and no saturating flux will flow through that portion of the legs about which are wound coils 15', 16' and 17'. It has proved to be an advantage in production to form the pick-up member as represented by 50 in Fig. 2, rather than as shown at 10 in Fig. 1, but it should be borne in mind that the operation of both members is essentially identical.

Although it is intended to use the circuit of Fig. 1 as an earth inductor compass, it may have other possible uses. However, when it is desired to use the device of the present invention as an earth inductor compass, it is essential to its faithful operation that the earth inductor or pick-up member 10 (or pick-up member 50, if this form is preferred) be maintained in a horizontal plane. To this end it is proposed to mount pick-up member 10 as shown in Fig. 3, upon a gyroscope 51, which is stabilized in any conventional manner about its vertical axis. Since different means of stabilization of gyroscopes about the vertical axis are well-known, no description thereof will be given at this time. However, upon gyroscope casing 52, there are mounted upright members 53 to which is attached a horizontal plate of insulating material 54, which carries pick-up device 10 secured thereto by any suitable means. The ends of windings 22, 23 and 24 are connected to the poles of stator member 28 in the same manner as shown in Fig. 1, and leads 19 and 20 are also connected to source of alternating current 21 in the manner shown in Fig. 1. Since the circuit of Fig. 3 is identical to the circuit of Fig. 1, no further explanation thereof is felt necessary.

It will be readily understood that regardless of pitch, roll or other accelerations of a ship or aircraft, gyroscope 51 will be maintained stable about the true vertical and thus, earth inductor or pick-up device 10 will be maintained horizontal, and magnetic errors, resulting in false indications of pointer 48, which would appear without stabilization of pick-up device 10, are thereby absent from the system.

It has been stated above that upon saturation of the central ring portion 14, magnetic flux, which otherwise threads through legs 11, 12 and 13, decreases due to the great increase in reluctance which results from the saturation of ring 14. It is elementary that when flux decreases in a permeable member, such as legs 11, 12 and 13, an alternating current is induced in windings, such as 15, 16 and 17, inductively associated therewith. When the current from source 21 falls below its saturating value, which happens twice during each exciting cycle, the earth's field will again increase through legs 11, 12 and 13 and induce another half cycle of alternating current each time in windings 15, 16 and 17. It will be apparent that with a given value of the horizontal component of the magnetic field, the voltage induced in windings 15, 16 and 17 will vary with the frequency of alternation of source 21.

The voltage induced in these windings also depends upon the saturation characteristics of the material used for central ring portion 14. In order to simplify the explanation of the invention above given, it has been stated that the earth inductor or pick-up device 10 is made of a high permeable material, such as "Permalloy" or "Mumetal." A high permeability is not necessary for the successful operation of this device, and many of the common paramagnetic materials such as silicon steel and soft iron can be successfully used. However, it has been found that the knees of the saturation curves for "Mumetal" and "Permalloy" have an exceedingly sharp bend as contrasted with the gradual, smooth curves of other magnetic materials. By the use of a material having a sharp knee to its saturation curve, a much higher voltage can be induced, since the saturation with the same exciting voltage and current will take place in a much shorter interval. Since the voltage induced in windings 15, 16 and 17 will depend to a great extent upon the rate at which the earth's flux is expelled from legs 11, 12 and 13, it will be readily apparent that a decided advantage is obtained by the use of these metals having a sharp bend on their saturation curves.

Instead of an alternating source of exciting current, there may be substituted for 21, a source of intermittent or pulsating direct current. If this latter source is used, a frequency doubler becomes unnecessary since the frequency in the output of windings 15, 16 and 17 will be the same as the frequency of interruption of the direct current source substituted for alternating source 21. It has been found also that a frequency doubler can be eliminated when a source of alternating current, such as 21, is used in conjunction with a direct current bias of a value such that with the bias alone, armature portion 14 is saturated; then on every other half cycle of alternating current from source 21, the bias will be overcome by the alternating current and the frequency in the output of windings 15, 16 and 17 will equal the frequency of source 21. This latter arrangement has proven to be beneficial where it is desired to work at extremely high frequencies of alternation, since the hysteresis loss is cut down and therefore, more output may be obtained from the windings 15, 16 and 17 of pick-up device 10.

The earth induction or pick-up devices shown at 10 and 50 have three legs, but the use of any desired number of legs, either separate or integral, such as four, is comprehended within the limits of the present invention. If four legs are used, the angular separation may be 90 degrees, and the legs may be formed integrally or of two or four pieces of material arranged to form a cross.

While only two embodiments of the present invention have been shown in the drawings, it is to be understood that various changes may be made without departing from the scope of the present invention. For this reason, it is intended not to limit the invention by the description herein given as an example, but solely by the scope of the appended claims.

What is claimed is:

1. In combination, controlling means comprising an inductive device having a multipolar stator winding and a rotor winding in inductive relation with said stator winding, a two-phase alternating current driving motor connected to actuate the rotor winding of said inductive device, a source of alternating current connected to energize one phase of said driving motor, an induction device comprising a closed core of highly permeable magnetic material having a plurality of pole pieces projecting therefrom adapted to receive a magnetic flux from a uni-directional magnetic field, a winding on each of said pole pieces, said pole piece windings being connected in multipolar relation to the multipolar winding of said inductive device, a single phase winding on said closed core and energized by said source of alternating current for varying the uni-directional flux in said pole pieces whereby another alternating current is induced in said pole piece windings, and means connecting the rotor winding of said inductive device to energize the other phase of said driving motor, whereby the latter rotates to actuate the rotor of said inductive device upon relative angular movement between said induction device and said uni-directional magnetic field.

2. In combination, controlling means comprising an inductive device having a multipolar stator winding and a rotor winding in inductive relation with said stator winding, a two-phase alternating current driving motor connected to actuate the rotor winding of said inductive device, a source of alternating current connected to energize one phase of said driving motor, direction responsive means comprising an induction device including a multipolar winding connected to the multipolar winding of said inductive device and a single phase winding energized by said source of alternating current whereby another alternating current is generated in the multipolar winding of said induction device, and means connecting the rotor winding of said inductive device to energize the other phase of said driving motor, whereby the latter rotates to actuate the rotor winding of said inductive device upon relative angular displacement of said direction responsive means in azimuth.

3. An earth inductor compass comprising, in combination with an indicator, an electromagnetic device connected to said indicator and comprising a rotor member and a stator member, one of said members having a multipolar winding, a two-phase driving motor drivably connected to the rotor member of said electromagnetic device, an earth inductor device comprising a closed core having three radially projecting pole pieces, a winding on each pole piece, said pole piece windings being connected together in multipolar relation and each winding connected to a corresponding pole of the multipolar winding of the electromagnetic device, a winding on the closed core of said earth inductor device, and a source of alternating current connected to said winding of said inductor device and to one phase of said driving motor to supply current to the winding of said one phase of said driving motor out of phase with the current supplied to the last-named winding of said inductor device, the winding of the other phase of said driving motor being connected to the winding of the rotor of said electromagnetic device, whereby displacement of the earth inductor device in azimuth produces an electromotive force in the winding of the rotor member of said electromagnetic device.

4. In combination, controlling means comprising an inductive device having a stator winding and a rotor winding, one of said windings being polyphase and the other being single phase, a two-phase alternating current driving motor connected to actuate the rotor winding of said inductive device and having a winding in each phase, a source of periodically varying current connected to energize the winding of one phase of said driving motor, a magnetic induction device comprising a relatively stationary core of highly permeable magnetic material adapted to be traversed by a magnetic flux from a uni-directional magnetic field and having a polyphase winding thereon, means connecting said induction device to said source of periodically varying current to vary the reluctance of said core whereby another periodically varying current is generated in the polyphase winding of said core member by the magnetic flux traversing said core member, means connecting the polyphase winding of said induction device to the polyphase winding of said inductive device, and means connecting the single phase winding of said inductive device to energize the winding of the other phase of said driving motor, whereby the latter rotates to actuate the rotor winding of said inductive device upon relative angular movement between the core of said induction device and said uni-directional magnetic field.

5. A magnetic compass comprising a magnetic pick-up device having a stationary core of permeable material to be disposed in a uni-directional magnetic field, a multipolar winding on said pick-up device, an exciting winding on said pick-up device, a source of periodically varying current connected to said exciting winding for periodically saturating said pick-up device to produce in said multipolar winding an alternating current from said uni-directional field, a two-phase alternating current driving motor having a winding in each phase thereof, means connecting said source of periodically varying current to one phase winding of said motor for energization thereby, means including amplifying means connecting the multipolar winding of said pick-up device to the other phase winding of said motor whereby, upon relative angular displacement between said pick-up device and said uni-directional field, said other phase winding becomes energized by the alternating current produced from said uni-directional field to cause said motor to rotate, and indicating means controlled by the rotation of said motor.

6. In combination, controlling means comprising a magnetic pick-up device of permeable material having a relatively stationary core and adapted to be disposed in a uni-directional magnetic field for relative angular displacement with respect thereto, a multipolar winding on said pick-up device, an exciting winding on said pick-up device, a source of periodically varying current connected to said exciting winding for periodically varying the reluctance of said pick-up device to produce in said multipolar winding an alternating current from said uni-directional magnetic field, a two-phase alternating current driving motor having a winding in each phase thereof, means connecting said source of periodically varying current to one phase winding of said motor for energization thereby, means including an amplifier connecting the multipolar winding of said pick-up device to the other phase winding of said motor whereby, upon relative angular displacement between said pick-up device and said uni-directional field, said other phase winding becomes energized by the alternating current produced from said uni-directional field to cause said motor to rotate, and means actuated by said motor in accordance with the amount and direction of relative angular displacement between said pick-up device and said uni-directional field.

7. In an earth inductor compass, a gyro-vertical, an earth induction device comprising a relatively stationary core of permeable material stabilized in a horizontal plane by said gyro-vertical and disposed to receive the horizontal component of the earth's magnetic field, a multipolar winding on said core, an exciting winding on said core, a source of periodically varying current connected to said exciting winding for periodically varying the magnetic reluctance of said core to produce in said multipolar winding an alternating current from said horizontal component of the earth's field, an inductive device having a rotor winding and a stator winding in inductive relation with each other, indicating means connected to be actuated by said rotor winding, a two-phase alternating current driving motor connected to actuate the rotor winding of said inductive device, said motor having a winding in each phase thereof, means connecting the multpolar winding of said induction device to one winding of said inductive device, means connecting said source of periodically varying current to one phase winding of said motor, and means connecting the other winding of said inductive device to the other phase winding of said motor whereby, upon relative angular displacement of said induction device in azimuth with respect to the earth's field, said other phase winding becomes energized to cause said motor to rotate and actuate the rotor winding of said inductive device, thereby actuating said indicating means to indicate the drection of the earth's field.

8. In combination, controlling means comprising an inductive device having a stator winding and a rotor winding, one of said windings being polyphase and the other being single phase, a two-phase alternating current driving motor connected to actuate the rotor winding of said inductive device and having a winding in each phase, a source of periodically varying current connected to energize the winding of one phase of said driving motor, a magnetic induction device comprising a relatively stationary core of highly permeable magnetic material adapted to be traversed by a magnetic flux from a uni-directional magnetic field and having a polyphase winding thereon, means connecting said induction device to said source of periodically varying current to vary the reluctance of said core whereby another periodically varying current is generated in the polyphase winding of said core member by the magnetic flux traversing said core member, means connecting the polyphase winding of said induction device to the polyphase winding of said inductive device, means connecting the single phase winding of said inductive device to energize the winding of the other phase of said driving motor, whereby the latter rotates to actuate the rotor winding of said inductive device upon relative angular movement between the core of said induction device and said uni-directional magnetic field, and a gyro-vertical having said induction device mounted thereon for stabilizing said device in the horizontal plane.

9. In combination, controlling means comprising a magnetic pick-up device of permeable material having a relatively stationary core and adapted to be disposed in a uni-directional magnetic field for relative angular displacement with respect thereto, a multipolar winding on said pick-up device, an exciting winding on said pick-up device, a source of periodically varying current connected to said exciting winding for periodically varying the reluctance of said pick-up device to produce in said multipolar winding an alternating current from said uni-directional magnetic field, a two-phase alternating current driving motor having a winding in each phase thereof, means connecting said source of periodically varying current to one phase winding of said motor for energization thereby, means including an amplifier connecting the multipolar winding of said pick-up device to the other phase winding of said motor whereby, upon relative angular displacement between said pick-up device and said uni-directional field, said other phase winding becomes energized by the alternating current produced from said uni-directional field to cause said motor to rotate, means actuated by said motor in accordance with the amount and direction of relative angular displacement between said pick-up device and said uni-directional field, and a gyro-vertical having said magnetic pick-up device mounted thereon for stabilizing said device in the horizontal plane.

10. In combination, controlling means comprising an inductive device having a multipolar stator winding and a rotor winding in inductive relation with said stator winding, a two-phase alternating current driving motor connected to actuate the rotor winding of said inductive device, a source of alternating current having a predetermined frequency, a frequency doubler connected to said source for doubling the frequency of the current from said source, means connecting said frequency doubler to energize one phase of said driving motor by said double frequency current, direction responsive means comprising an induction device including a multipolar winding connected to the multipolar winding of said inductive device and a single phase winding energized by said source of alternating current whereby another alternating current is generated in the multipolar winding of said induction device, having the same frequency as the double frequency current from said frequency doubler, and means connecting the rotor winding of said inductive device to energize the other phase of said driving motor, whereby the latter rotates to actuate the rotor winding of said inductive device upon relative angular displacement of said direction responsive means in azimuth.

11. In combination, controlling means comprising an inductive device having a stator winding and a rotor winding, one of said windings being polyphase and the other being single-phase, a two-phase alternating current driving motor connected to actuate the rotor winding of said inductive device and having a winding in each phase, a source of periodically varying current of predetermined frequency, means for producing a second periodically varying current having a frequency which is an even multiple of the frequency of said first current, means connecting one phase of said driving motor for energization by said second current, a magnetic induction device adapted to be traversed by a magnetic flux of a uni-directional magnetic field and including relatively stationary core means of magnetically permeable material having a polyphase winding and a single phase winding thereon, means connecting the polyphase winding of said induction device to the polyphase winding of said inductive device, means connecting the single-phase winding of said induction device to said source of periodically varying current of predetermined frequency, whereby an alternating current is generated in the polyphase winding of said induction device for energizing the polyphase winding of said inductive device, and means connecting the single phase winding of said inductive device to the other phase of said driving motor, whereby the latter rotates to actuate the rotor winding of said inductive device upon relative angular movement between said induction device and said uni-directional magnetic field.

12. In combination, controlling means comprising an inductive device having a multipolar stator winding and a rotor winding in inductive relation with said stator winding, a two-phase alternating current driving motor connected to actuate the rotor winding of said inductive device, a source of alternating current of predetermined frequency, means for producing a second alternating current having a frequency twice that of said first alternating current, means connecting one phase of said driving motor for energization by said second current, direction responsive means comprising a magnetic induction device adapted to be traversed by a magnetic flux of a uni-directional magnetic field and including core means of magnetically permeable material having a multipolar output winding and an input winding thereon, means connecting the multipolar winding of said induction device to the multipolar winding of said inductive device, means connecting the input winding of said induction device to said source of alternating current of predetermined frequency, whereby an alternating current is generated in the multipolar output winding of said induction device having the same frequency as said second alternating current for energizing the multipolar winding of said inductive device, and means connecting the rotor winding of said inductive device to the other phase of said driving motor, whereby the latter rotates to actuate the rotor winding of said inductive device upon relative angular movement between said induction device and said uni-directional magnetic field.

13. In combination, controlling means comprising an inductive device having a multipolar stator winding and a rotor winding in inductive relation with said stator winding, an electromagnetic actuating device connected to rotate the rotor winding of said inductive device, a source of alternating current, an induction device comprising a closed core of highly permeable magnetic material having a plurality of pole pieces projecting therefrom adapted to receive a magnetic flux from a uni-directional magnetic field, a winding on each of said pole pieces, said pole piece windings being connected in multipolar relation to the multipolar winding of said inductive device, a single phase winding on said closed core connected to be energized by said source of alternating current for varying the uni-directional flux in said pole pieces whereby another alternating current is induced in said pole piece windings, and means connecting the rotor winding of said inductive device to energize the electromagnetic actuating device, whereby the latter rotates the rotor of said inductive device upon relative angular movement between said induction device and said uni-directional magnetic field.

14. In combination, controlling means comprising an inductive device having a multipolar stator winding and a rotor winding in inductive relation with said stator winding, an electromagnetic actuating device connected to rotate the rotor winding of said inductive device, a source of alternating current, direction responsive means comprising an induction device including a multipolar winding connected to the multipolar winding of said inductive device and a single phase winding energized by said source of alternating current, whereby another alternating current is generated in the multipolar winding of said induction device, and means connecting the rotor winding of said inductive device to energize the electromagnetic actuating device, whereby the latter rotates the rotor winding of said inductive device upon relative angular displacement of said direction responsive means in azimuth.

15. In combination, controlling means comprising an inductive device having a stator winding and a rotor winding, one of said windings being polyphase and the other being single phase, means comprising an electromagnetic actuating device connected to rotate the rotor winding of said inductive device, a source of periodically varying current, a magnetic induction device comprising a relatively stationary core of permeable magnetic material adapted to be traversed by a magnetic flux from a uni-directional magnetic field and having a polyphase winding thereon, means connecting said induction device to said source of periodically varying current to vary the reluctance of said core, whereby another periodically varying current is generated in the polyphase winding of said core member by the magnetic flux traversing said core member, means connecting the polyphase winding of said induction device to the polyphase winding of said inductive device, and means connecting the single phase winding of said inductive device to energize the electromagnetic actuating device, whereby the latter rotates the rotor winding of said inductive device upon relative angular movement between the core of said induction device and said uni-directional magnetic field.

16. In combination, controlling means comprising an inductive device having a stator winding and a rotor winding, one of said windings being polyphase and the other being single phase, an electromagnetic actuating device including relatively stationary coil means and a movable member cooperating with said coil means, means connecting said movable member to rotate the rotor winding of said inductive device, a source of periodically varying current, a magnetic induction device comprising relatively stationary core means of permeable magnetic material adapted to be traversed by a magnetic flux from a uni-directional magnetic field and having a polyphase winding thereon, means connecting said induction device to said source of periodically varying current to vary the reluctance of said core means whereby another periodically varying current is generated in the polyphase winding of said core means by the magnetic flux traversing said core means, means connecting the polyphase winding of said induction device to the polyphase winding of said inductive device, and means connecting the single phase winding of said inductive device to energize the coil means of said electromagnetic actuating device, whereby the latter rotates the rotor winding of said inductive device upon relative angular displacement between said induction device and said uni-directional magnetic field.

17. In combination, controlling means comprising an inductive device having a multipolar stator winding and a rotor winding, an electromagnetic actuating device, means mechanically connecting said actuating device to the rotor winding of said inductive device for rotating said rotor winding, a source of alternating current, an induction device comprising a closed core of permeable magnetic material having a plurality of pole pieces projecting therefrom adapted to receive a magnetic flux from a uni-directional magnetic field, a winding on each of said pole pieces, said pole piece windings being connected in multipolar relation to the multipolar stator winding of said inductive device, a single phase winding on said closed core connected to be energized by said source of alternating current, and means electrically connecting the rotor winding of said inductive device to said electromagnetic actuating device for energizing the latter.

18. In combination, controlling means comprising an inductive device having a multipolar stator winding and a rotor winding, an electromagnetic actuating device, means drivably connecting said actuating device to the rotor winding of said inductive device for rotating said rotor winding, a source of alternating current, direction responsive means comprising an induction device disposed in and traversed by the magnetic flux of a uni-directional magnetic field and including a stationary multipolar winding electrically connected to the multipolar winding of said inductive device and a stationary single phase winding electrically connected to said source of alternating current for energization thereby, and means electrically connecting the rotor winding of said inductive device to said electromagnetic actuating device for energizing the latter.

19. In combination, controlling means comprising an inductive device having a stator member and a rotor member, one of said members having a polyphase winding thereon and the other having a single phase winding thereon, means comprising an electromagnetic actuating device having a relatively stationary part with coil means thereon and a relatively movable part cooperating with said stationary part, means mechanically connecting said movable part to rotate the rotor of said inductive device, a source of periodically varying current, a magnetic induction device comprising relatively stationary core means of permeable magnetic material adapted to be traversed by a magnetic flux from a uni-directional magnetic field and having a polyphase winding thereon, means connecting said induction device to said source of periodically varying current to vary the reluctance of said core means, whereby another periodically varying current is generated in the polyphase winding of said induction device by the magnetic flux traversing said core means, means connecting the polyphase winding of said induction device to the polyphase winding of said inductive device, and means electrically connecting the single phase winding of said inductive device to the coil means of said electromagnetic device for energizing the latter to actuate the movable part thereof.

ALFRED A. STUART, JR.